Aug. 12, 1941.   M. M. SAFFORD   2,252,440
DYNAMOELECTRIC MACHINE
Filed March 15, 1940
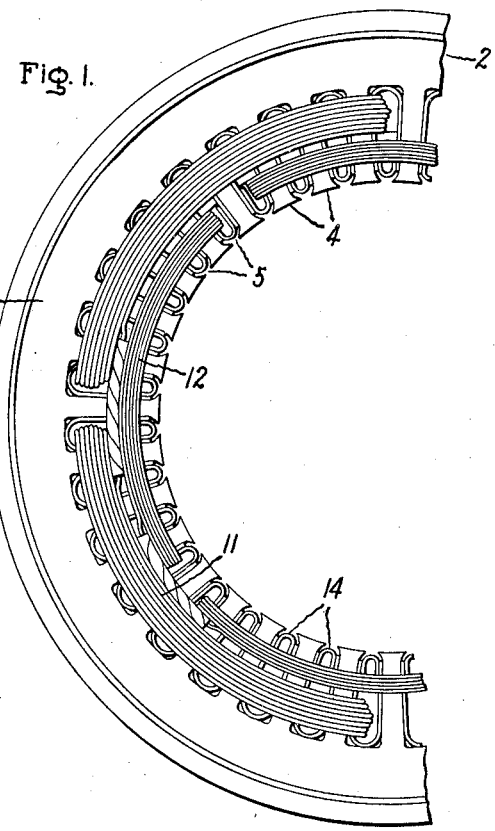
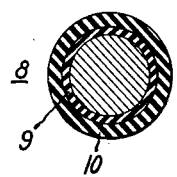
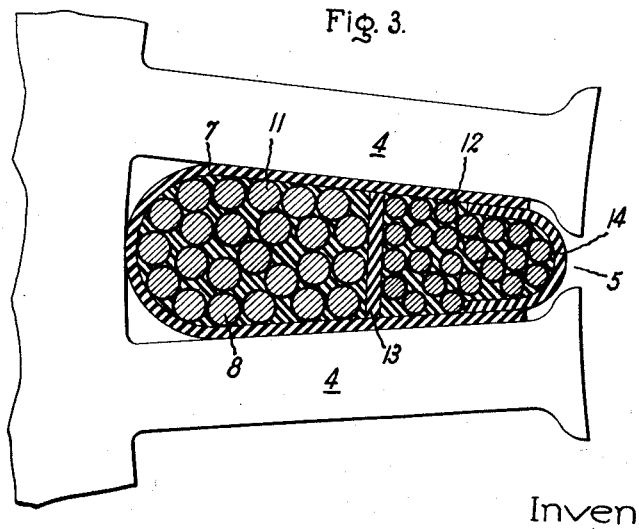
Inventor:
Moyer M. Safford,
by Harry E. Dunham
His Attorney.

Patented Aug. 12, 1941

2,252,440

UNITED STATES PATENT OFFICE 2,252,440

DYNAMOELECTRIC MACHINE

Moyer M. Safford, Schenectady, N. Y., assignor to General Electric Company, a corporation of New York Application March 15, 1940, Serial No. 324,179

4 Claims. (Cl. 171—252)

This invention relates to dynamo-electric machines and more particularly to certain improvements and modifications in the insulation of such machines.

In the manufacture of dynamo-electric machines, for example, small motors, it has been common practice repeatedly to immerse parts thereof, for example, the wound stationary members or stators, in an insulating varnish and thereafter to bake the impregnated stator in an oven for four to twelve hours after each impregnation at a temperature of about 100° to 150° C. The objects of such treatment are to moisture-proof the paper, fiber, cotton cloth and similar insulating material used in the construction of the stator and to hold the coils in a solid mass so as to prevent wear by vibration. This varnish treatment is time consuming and expensive and constitutes a "bottle neck" in the process of manufacturing small motors, thus materially increasing the cost of constructing such motors.

Further, when using conductors previously insulated solely with organic enamels of the oleoresinous type, the ordinary coil impregnating varnishes have a detrimental effect upon these insulating enamels as the temperatures necessary to cure or harden the impregnating varnish are ordinarily sufficiently high to embrittle or otherwise injure the conductor insulation. For example, some enamel films on the wire are ruptured when the enameled wires are stretched, for example, during fabrication of electrical apparatus, and the stretched wire is contacted with hot impregnating varnish. Finally, although in impregnating these motor or generator stators and coils a 100 per cent impregnation is hoped for, it is but rarely obtained. This condition is only slightly improved by increasing the number of varnish treatments as the baking of the first application of varnish ordinarily results in a sealing of the surface of the coil or stator thus preventing access of subsequent applications of varnish to the interior portions thereof.

It is an object of the present invention to simplify the insulation of dynamo-electric machines so that they can be produced easily and cheaply with a minimum expenditure of labor and material and without the necessity of a varnish treatment subsequent to the assembly.

In accordance with my invention, these results are obtained by using a plasticized polyvinyl chloride as the sole means to provide the necessary space factor between the individual enamel-coated conductors constituting the coil and to bind the coiled conductors into a solid, vibration-proof mass. I am thereby able to provide a moisture- and oil-proof insulating system for dynamo-electric machines which results in better motor performance particularly under high humidity conditions or under conditions wherein the motor is immersed in or subject to attacks by moisture, oil or the like.

Further advantages of my invention will become more apparent from the following description thereof taken in connection with the accompanying drawing in which Fig. 1 is an end view of a portion of a stator of a dynamo-electric machine embodying my invention; Fig. 2 is a cross section of the coated and insulated conductor used in winding the stator; and Fig. 3 is an enlarged sectional view of the stator shown in Fig. 1.

With reference to the drawing, the portion of a dynamo-electric machine shown therein comprises a stationary element or stator 1 having a magnetizable core 2 which may be made of laminations but which also may be made in any other suitable form. The core 2 consists of a main or yoke portion 3 having teeth 4 extending therefrom to form a number of coil retaining slots 5. A ring 6 forms a frame for supporting the core. The slots 5 may or may not be provided with an insulating liner 7. The latter preferably is formed of a strong, tough, fibrous material, such as paper, coated and impregnated with a plasticized polyvinyl chloride composition. Other materials capable of forming with the polyvinyl chloride a moisture-resisting liner of high dielectric strength may be substituted for the paper.

Suitable conductors 8 are provided with dual coatings of insulating and binding materials as shown in Fig. 2. A hardened insulating film of enamel 9 is first applied directly to the conductor by methods well known in the art. Any of the organic enamels may be used for this purpose, although I prefer one containing a heat-treated product of condensing an aldehyde with the product of hydrolysis of a polyvinyl ester. Such products are broadly known as polyvinyl resins. By use of these resins a hard, tough, flexible, tightly adhering, abrasion-resistant, insulating film is obtained on the wire which film insulates the individual strands one from another under all operating conditions.

Before the insulated conductors 8 are wound into slots 5, they are provided with an outer layer or coating 10 comprising plasticized polyvinyl chloride which in the final structure serves to moisture-proof the coils and bind the individual windings into a solid vibration-proof mass. The plasticized polyvinyl chloride is preferably extruded onto the wire which was previously coated with a baked enamel film in the following manner. The enamel coated wire is rapidly passed through a gas flame at such a rate as to bring the wire and the coating roughly to the temperature of the polyvinyl chloride mass and immediately thereafter the polyvinyl chloride is extruded onto the enamel covered wire to obtain a firm bond between the enamel coating and the extruded layer of polyvinyl chloride.

The polyvinyl chloride used for these coverings may contain from 15 to 40 per cent of any well known plasticizer, for example tricresylphosphate. Preferably, the smallest amount of plasticizer that will permit proper extrusion of the polyvinyl chloride coating without unduly softening the polyvinyl chloride composition should be used in order that a tough film may be obtained. Although I prefer to apply the plasticized polyvinyl chloride by the above method, my invention is not limited thereto and it may be wrapped onto the insulated conductor in tape form or applied from a solution.

After the conductors 8 have been provided with the above mentioned coatings, they are wound into the slots 5. In the embodiment of the invention shown in the drawing, these slots contain superposed layers of insulated, motor-running conductor windings 11 and insulated, motor-starting conductor windings 12 separated by a separator 13 and retained in the slots by means of wedges 14. The separators and wedges are preferably of the same material as slot liner 7.

The assembled stator comprising liners, separators and insulated conductors coated with the polyvinyl chloride is thereafter subjected to a suitable heat treatment by passing current through the windings 11 and taking advantage of the $I^2R$ losses to seal the individual conductors into an integral moisture-proof body comprising the enamel insulated conductors bonded by the polyvinyl chloride medium as shown in Fig. 3. Because all of the insulating material forming the slot insulation and conductor insulation is of a thermoplastic nature, the liners, conductors and separator are quickly fused into a single vibration-proof body not requiring a subsequent varnish treatment of the wound stator. Thus, by the practice of my invention, a material saving in time and cost in producing such stators is obtained and the resultant product exhibits an increased resistance to moisture, oil or other mediums.

Stators prepared in accordance with my invention in which the enameled wire has been coated with a thin wall of 20 per cent plasticized polyvinyl chloride have been submerged in water and the resistance to ground tested at predetermined intervals throughout a year. Such coils, although continuously immersed in water during that time, have shown no decrease in resistance to ground.

Whereas in the usual methods of motor manufacture repeated varnish impregnating and baking operations are necessary, in the preparation of a motor by my process such time consuming operations are completely eliminated and the entire bonding and moisture-proofing treatments may be carried out in as short a time as two minutes. Motors insulated in accordance with my invention are particularly adapted to use wherever severe humidity or moisture conditions are encountered or where the motor windings are subject to contact with mineral oil, acids, alkalis or the like.

What I claim as new and desire to secure by Letters Patent of the United States is:

1. A dynamo-electric machine having a member comprising a magnetic core and windings of an electrical conductor about said core, said conductor being provided with insulation consisting of an inner layer of a heat hardened organic enamel applied directly to said conductor and an outer layer of plasticized polyvinyl chloride, the said polyvinyl chloride layer serving to bond said windings into an integral moisture- and oil-proof mass.

2. A dynamo-electric machine comprising a core provided with a plurality of slots, a liner in each of said slots, a plurality of coils of insulated electrical conductors within the lined slots, the insulation on said conductors consisting of an inner layer of a heat hardened organic enamel applied directly to said conductors and an outer layer of thermoplastic plasticized polyvinyl chloride, the said conductors and said liners being bonded into an integral moisture- and oil-proof mass by fusion of the polyvinyl chloride layers.

3. A motor having a stationary member comprising a core provided with a plurality of slots, a liner in each of said slots comprising a fabric base coated with plasticized polyvinyl chloride, coils within each of the lined slots, said coils consisting of conductors coated with insulation consisting of a layer of a heat hardened polyvinylal resin and an outer layer of fused plasticized polyvinyl chloride serving to bond said liners and said conductors into an integral mass.

4. The process of preparing dynamo-electric machines containing magnetic cores having a plurality of coil retaining slots and a plurality of coils within said slots which comprises coating an enamel insulated conductor with a layer of thermoplastic plasticized polyvinyl chloride, winding said coated conductor into the coil retaining slots, and heating said windings in their final position in said slots to obtain a structure in which said windings are fused into a solid, vibration-proof, oil and moisture-resistant coil by fusion of the polyvinyl chloride layers.

MOYER M. SAFFORD.